United States Patent
Kummaraguntla

(10) Patent No.: US 10,103,759 B2
(45) Date of Patent: Oct. 16, 2018

(54) MULTIPLE POWER TRANSMITTER FOR RF RECEIVER OR THE LIKE

(71) Applicant: SILICON LABORATORIES, INC., Austin, TX (US)

(72) Inventor: Ravi K. Kummaraguntla, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 15/282,327

(22) Filed: Sep. 30, 2016

(65) Prior Publication Data

US 2018/0097531 A1   Apr. 5, 2018

(51) Int. Cl.
*H04B 1/02*    (2006.01)
*H04B 1/04*    (2006.01)

(52) U.S. Cl.
CPC ................ *H04B 1/0483* (2013.01)

(58) Field of Classification Search
CPC . H04B 1/04; H04B 1/30; H04B 1/408; H04B 2001/0416; H04B 1/40; H04B 1/18; H04B 1/1027; H04B 1/28; H04B 1/0458; H04B 17/318

USPC .......................................................... 455/91
See application file for complete search history.

(56) References Cited

U.S. PATENT DOCUMENTS

| | | | |
|---|---|---|---|
| 6,201,439 B1 | 3/2001 | Ishida et al. | |
| 7,869,771 B2* | 1/2011 | Zolfaghari | H04B 1/0483 340/539.3 |
| 9,350,412 B1 | 5/2016 | Rafi et al. | |
| 2010/0220022 A1* | 9/2010 | Yoon | H01Q 1/243 343/727 |

* cited by examiner

*Primary Examiner* — Ajibola Akinyemi
(74) *Attorney, Agent, or Firm* — Polansky & Associates, P.L.L.C.; Paul J. Polansky

(57) ABSTRACT

In one form, a radio frequency (RF) transmitter includes an RF signal source, a balanced/unbalanced transformer (balun), and first and second amplification circuits. The balun has a primary side adapted to be coupled to an antenna, and a secondary side. The first amplification circuit has an input coupled to the RF signal source, and an output coupled to the primary side of the balun. The second amplification circuit has an input coupled to the RF signal source, and an output coupled to the secondary side of the balun. The second amplification circuit has a higher output power than the first amplification circuit.

28 Claims, 4 Drawing Sheets

MULTIPLE POWER TRANSMITTER FOR RF RECEIVER OR THE LIKE

FIELD OF THE DISCLOSURE

The present disclosure relates generally to radio frequency (RF) circuits, and more particularly to RF transmitters.

BACKGROUND

RF transceivers are used in a variety of modern electronics, such as smartphones, digital radios, modems, routers, printers, and internet gateways. A variety of communication standards have been recently introduced to use over-the-air RF transmission and reception capabilities for relatively short distances, including near-field communication (NFC) having a distance of about 10 centimeters, personal area networks operative from 10 to 100 meters using a protocols such as "ZigBee", "Bluetooth" and Bluetooth low energy (BTLE), and wireless local area networks such as "WiFi" having a maximum distance that varies based on conditions but under ideal conditions has been measured at over 300 meters. These standards are designed for particular purposes and generally have different power and signaling requirements. Many electronic products now support multiple ones of these standards, but providing separate circuitry for each standard increases product cost. Moreover it is difficult to design low-cost, reliable transmitters using a common antenna that provide acceptable characteristics to support a wide variety of these transmission standards.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

In one form, a radio frequency (RF) transmitter includes an RF signal source, a balanced/unbalanced transformer (balun), and first and second amplification circuits. The balun has a primary side adapted to be coupled to an antenna, and a secondary side. The first amplification circuit has an input coupled to the RF signal source, and an output coupled to the primary side of the balun. The second amplification circuit has an input coupled to the RF signal source, and an output coupled to the secondary side of the balun. The second amplification circuit has a higher output power than the first amplification circuit.

In another form, the RF transmitter can be included in an integrated circuit. The integrated circuit can use low voltage complementary metal-oxide-semiconductor (CMOS) transistors in the first (low output power) amplification circuit while using both low- and high-voltage CMOS transistors in the second (high output power) amplification circuit.

In yet another form, a method comprises receiving the modulated signal. The modulated signal is selectively amplified according to a first output power level to form a first amplified signal, and according to a second output power level higher than the first output power level to form a second amplified signal. The first amplified signal is inputted to a primary side of a balun, and the second amplified signal is input to a secondary side of the balun. A radio frequency output signal is outputted to a transmission medium, for example to an antenna for over-the-air transmission, in response to a signal at the primary side of said balun.

Figure 1:
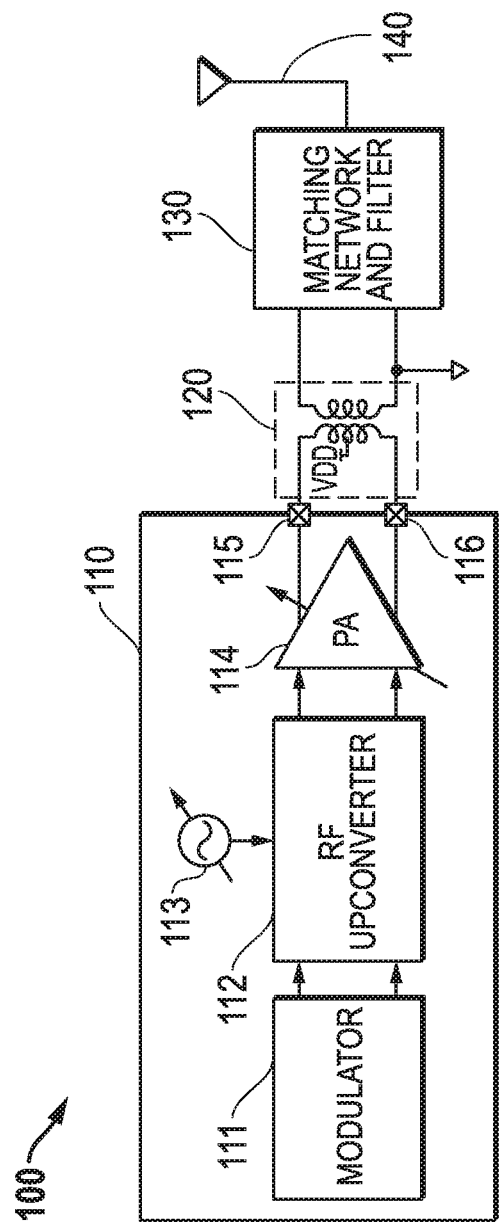
FIG. 1 illustrates in partial block diagram and partial schematic form a radio frequency (RF) transmitter known in the prior art.

FIG. 1 illustrates in partial block diagram and partial schematic a radio frequency (RF) transmitter 100 known in the prior art. RF transmitter 100 includes an integrated circuit 110, a balanced-unbalanced transformer (balun) 120, a matching network and filter 130, and an antenna 140. Integrated circuit 110 includes a modulator 111, an RF upconverter 112, a local oscillator 113, a power amplifier (PA) 114, and integrated circuit terminals 115 and 116. Modulator 111 provides a differential output signal after the baseband signal content has been converted to another representation having a frequency spectrum. RF upconverter 112 has a differential input, a mixing input, and a differential output. Local oscillator 113 has a tuning input and an output connected to the mixing input of RF upconverter 112. Power amplifier 114 has a differential input connected to the differential output of RF upconverter 112, a control input, and a differential output connected to integrated circuit terminals 115 and 116.

Balun 120 has a primary (unbalanced or single-ended) side and a secondary (balanced or differential) side. The primary side has a first terminal forming a signal terminal, and a second terminal forming a common terminal that is connected to ground. The secondary side has a first terminal connected to integrated circuit terminal 115, a second terminal connected to integrated circuit terminal 116, and a center tap connected to a power supply voltage terminal labeled "$V_{DD}$". $V_{DD}$ is a power supply terminal having a nominal voltage of, for example, 3.0 volts.

Matching network and harmonic filter 130 has a transceiver side with a first terminal connected to the signal terminal of balun 240 and a second terminal connected to ground, and an antenna side connected to antenna 140. Antenna 140 transmits and receives signals with another antenna using an air medium. However in other embodiments, antenna 140 could be replaced with a coupling to another medium such as twisted pair, coaxial cable, fiber optic cable, and the like.

RF transmitter 100 illustrates several drawbacks that limit its ability to work in different transmission environments or that cause other problems. First, RF transmitter 100 implements differential signaling but requires an additional balun 120, adding to overall cost and board space. Second, RF transmitter 100 lacks flexibility when operating in a wide variety of applications. Local oscillator 113 is tunable, but it cannot be practically implemented when the carrier frequency can vary over a large range, requiring duplicate paths for different carrier frequencies. Third, RF transmitter 100 is inefficient at high output power levels. Balun 120 causes significant resistive ($I^2R$) losses, and these losses increase at higher power levels.

Figure 2:
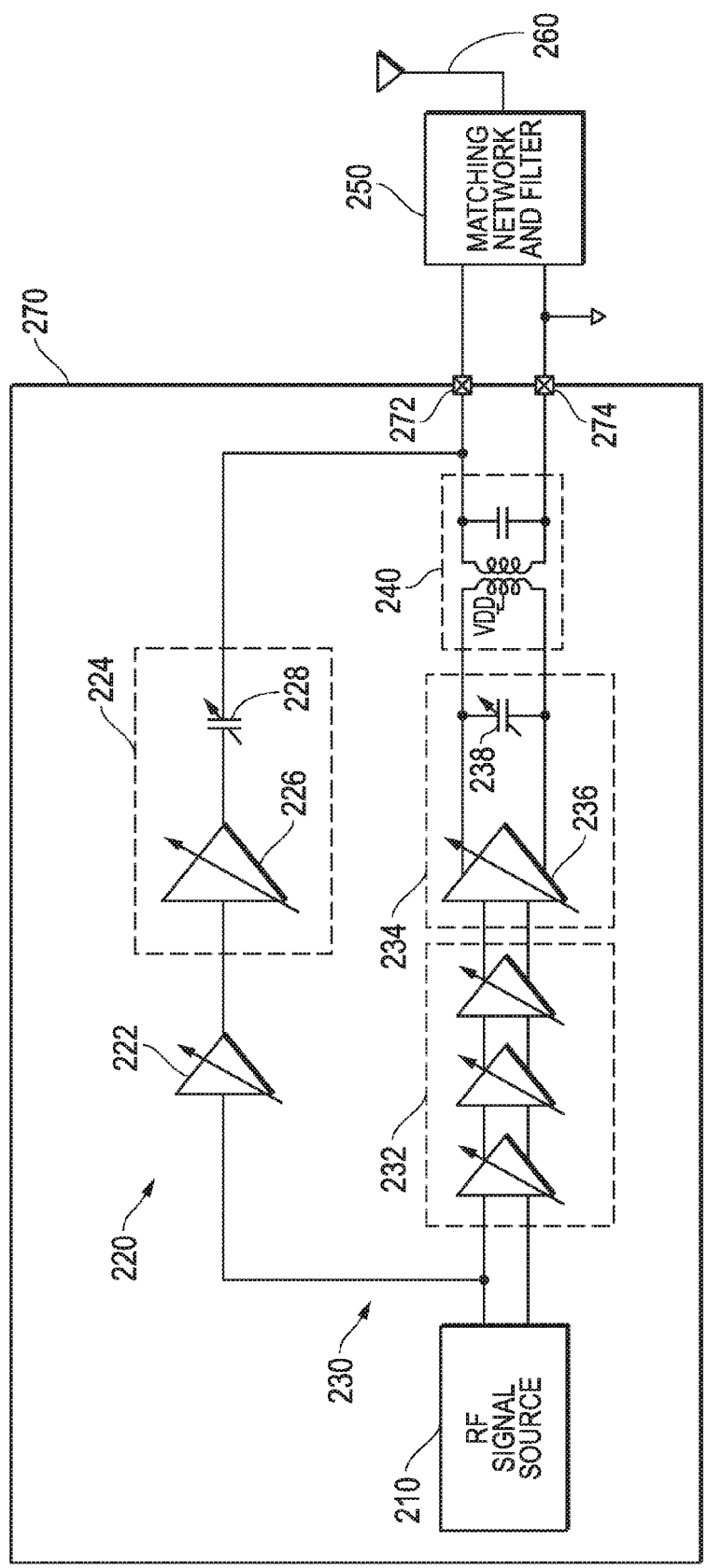
FIG. 2 illustrates in partial block diagram and partial schematic form a multiple power transmitter according to an embodiment of the present invention.

FIG. 2 illustrates in partial block diagram and partial schematic form a multiple power transmitter 200 according to an embodiment of the present invention. Multiple power transmitter 200 includes generally an RF signal source 210, a low-power amplification circuit 220, a high-power amplification circuit 230, a balanced-unbalanced transformer (balun) 240, a matching network and harmonic filter 250, and an antenna 260.

RF signal source 210 has an output for providing a differential modulated signal at a desired carrier frequency. The architecture of multiple power transmitter 200 is applicable to a wide variety of modulation techniques and carrier frequencies. In one particular embodiment, RF signal source 210 generates the differential modulated signal using a programmable frequency synthesizer that is capable of outputting a modulated signal at a carrier frequency of up to 2.4 gigahertz (GHz). In another embodiment, RF signal source includes two modulators in parallel, one used for providing a signal at a 2.4 gigahertz (GHz) carrier frequency, and another one used for providing a signal at a 915 megahertz (MHz) carrier frequency Low-power amplification circuit 220 includes a variable gain amplifier 222 and an output stage 224. Variable gain amplifier 222 is a variable gain amplifier that has an input connected to one of the differential outputs of RF signal source 210, a control input, and an output. Output stage 224 includes a variable gain amplifier 226 and a capacitor 228. Variable gain amplifier 226 has an input connected to the output of variable gain amplifier 222, a control input, and an output. Capacitor 228 has a first terminal connected to the output of variable gain amplifier 226, a control terminal, and a second terminal. Low-power amplification circuit 220 also has an associated control circuit such as an automatic gain control (AGC) circuit, not shown in FIG. 2, which provides outputs to the control inputs of variable gain amplifiers 222 and 226 to adjust the overall gain to a desired level. In this example, output stage 224 is capable of outputting a signal at a power level of 0 dBm (0 decibels with respect to a power of 1 milliwatt).

High-power amplification circuit 230 includes generally a pre-amplification circuit 232 and an output stage 234. Pre-amplification circuit 232 includes a series of variable gain amplifiers in which the first variable gain amplifier has a differential input connected to the differential output of RF signal source 210, and a differential output, the last variable gain amplifier has a differential input and a differential output forming the output of pre-amplification circuit 232, and each intermediate variable gain amplifier has a differential input connected to a differential output of a prior variable gain amplifier in the series, and a differential output connected to a differential input of a succeeding variable gain amplifier in the series. Each variable gain amplifier also has a control input. Output stage 234 includes an amplifier 236 having a differential input connected to the differential output of pre-amplification circuit 232, a differential output, and a control input, and a variable capacitor 238 having terminals connected between each output of the differential output of amplifier 236, and a control input. Like low-power amplification circuit 220, high-power amplification circuit 230 has an associated control circuit such as an AGC circuit, not shown in FIG. 2, which provides outputs to the control inputs of each variable gain amplifier to adjust the overall gain to a desired level. In this example, output stage 234 is capable of outputting a signal at a power level of 20 dBm.

Balun 240 has a primary (unbalanced or single-ended) side and a secondary (balanced or differential) side. The primary side has a first terminal connected to the second terminal of capacitor 228 and to an integrated circuit terminal 272, and a second terminal forming a common terminal connected to and to an integrated circuit terminal 274 which itself is connected to ground. The secondary (balanced or differential) side is connected to the differential output of output stage 234 and with a center tap connected to $V_{DD}$.

Matching network and harmonic filter 250 has a transceiver side with a first terminal connected to integrated circuit terminal 272, a second terminal connected to integrated circuit terminal 274 and to ground, and an antenna side connected to antenna 260. In the example of multiple power transmitter 200 of FIG. 2, RF signal source 210, low-power amplification circuit 220, high-power amplification circuit 230, and balun 240 are combined in an integrated circuit 270 that uses low-cost complementary MOS (CMOS) technology.

Multiple power transmitter 200 combines a low-power amplification circuit 220 and a high-power amplification circuit 230 with an integrated balun 240 in which low-power amplification circuit 220 is connected to the primary (single-ended) side of balun 240 and high-power amplification circuit 230 is connected to the secondary (differential) side of balun 240. Because it is configurable to support both low-power and high-power operation, multiple power transmitter 200 is useful in a microcontroller unit (MCU) that itself may be used in a variety of applications.

RF signal source 210 is capable of providing a modulated RF signal at a variety of carrier frequencies. For example in one embodiment, it is programmable to provide an RF signal at 2.4 GHz and also a sub-GHz signal such as an RF signal at 915 megahertz (MHz). As shown in FIG. 2, RF signal source 210 is a single block but it could be implemented with either two signal sources that form a single output, or with one signal source as shown.

High-power amplification circuit 230 uses a differential architecture and converts the differential signal to single-ended form using an integrated balun (balun 240). This signal path is advantageous for relatively high-power and high frequency outputs. Balun 240 provides two advantages under these conditions. First, integrated circuit bond wires have an inductance that creates an impedance that increases as frequency increases. The high inductance creates a high offset to ground for signals at high frequencies such as 2.4 GHz. However in differential architectures the only current flowing into ground is DC common-mode current because the differential components cancel out in balun 240.

Second, balun 240 cancels second harmonics created when multiple-power transmitter 200 is implemented using a CMOS integrated circuit 270. CMOS transistors operate according to a square-law characteristic. The square-law characteristic inherently creates second harmonics when the modulated signal is mixed with the carrier signal. The second harmonic can have a power level as high as −20 dBm when using CMOS transistors. In the illustrated embodiment using commercially available CMOS processes with integrated inductors, balun 240 provides an additional 25 dB of second harmonic attenuation so that multiple power transmitter 200 provides a total of 45 dBm of second harmonic attenuation, which is sufficient for most common applications without the need to design high-power amplification circuit 230 to be especially low-noise. Thus the circuits used in integrated circuit 270 can be implemented cheaply using low-cost CMOS technology.

As output power of the amplification circuit increases, I²R losses through balun 240 increase. However because integrated circuit 270 combines the other circuits with balun 240 on-chip, balun 240 only causes about 3 dB of loss.

At low output power levels such as 0 dBm, low-power amplification circuit 220 provides better operation by bypassing balun 240 because the problems creating the need for balun 240 at higher power levels do not exist at lower power levels. As power levels decrease, second harmonic power levels also decrease. In general if a modulated signal is expressed as Acosθt, then CMOS amplifiers will output a signal proportional to $(A\cos\theta t)^2$, which is proportional to $A^2$. At low power levels in which A<1 (i.e. one milliwatt), then $A^2 \ll 1$. Note that standards setting bodies, such as the U.S. Federal Communications Commission (FCC), specify second harmonic attenuation requirement in absolute terms with respect to the power level of the primary at the carrier frequency. Thus integrated circuit 270 keeps the power level of the second harmonic power sufficiently low at low output power levels without the need for the second harmonic attenuation provided by balun 240.

Figure 3:
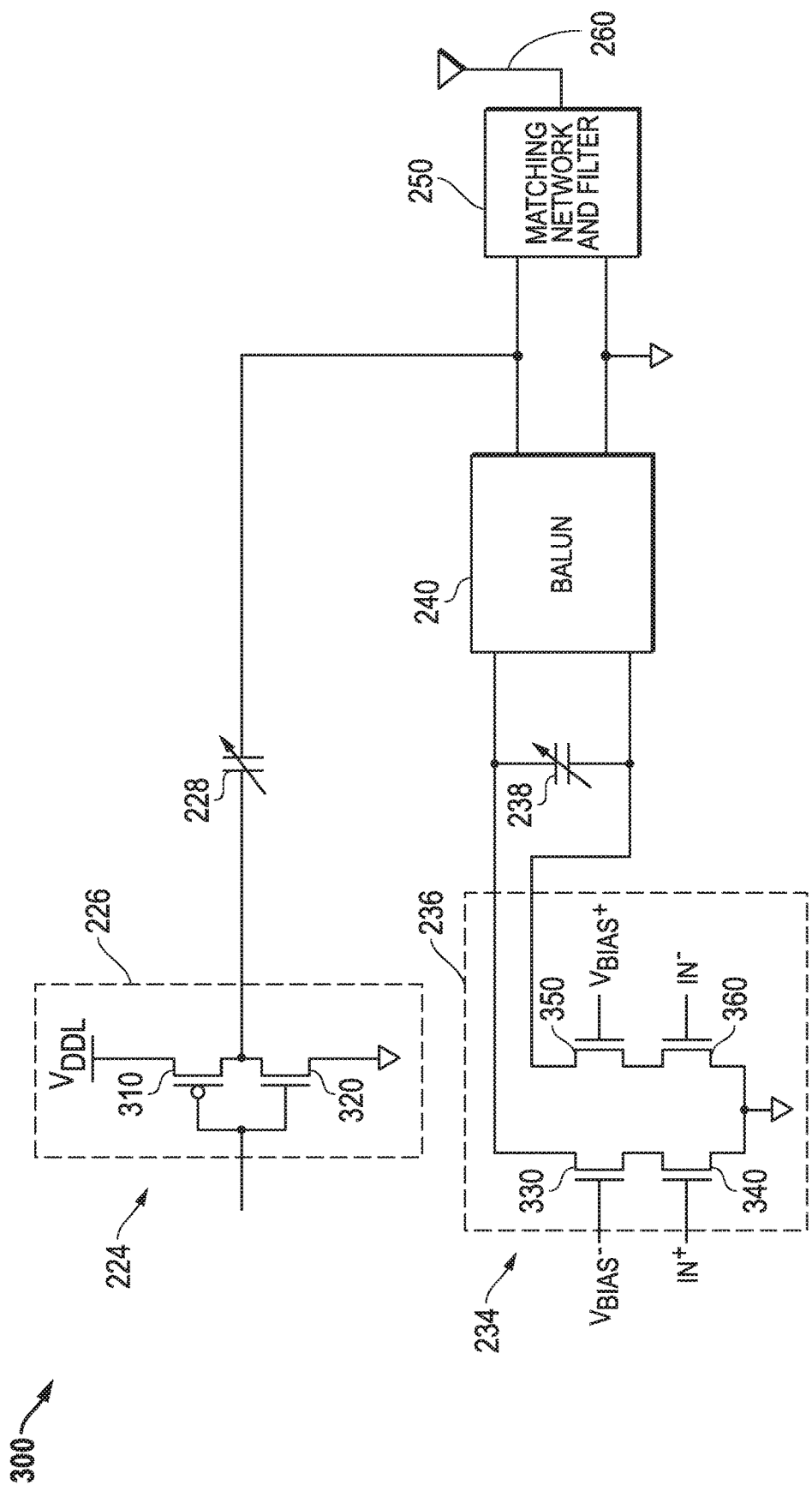
FIG. 3 illustrates in partial block diagram and partial schematic form a portion of the multiple power transmitter of FIG. 1.

FIG. 3 illustrates in partial block diagram and partial schematic form a portion 300 of multiple power transmitter 200 of FIG. 2. Portion 300 shows output stages 224 and 234 of low-power amplification circuit 220 and high-power amplification circuit 230, respectively, balun 240, matching network and harmonic filter 250, and antenna 260. Output stage 224 includes variable gain amplifier 226 and capacitor 228. Variable gain amplifier 226 includes a P-channel MOS transistor 310 and an N-channel MOS transistor 320. Transistor 310 has a source connected to a power supply voltage terminal labeled "$V_{DDL}$", a gate connected to the output of variable gain amplifier 222, and a drain connected to the first terminal of capacitor 228. $V_{DDL}$ is a relatively low-valued power supply voltage terminal having a nominal voltage, for example, of 1.2 volts. Transistor 320 has a drain connected to the drain of transistor 310 and to the first terminal of capacitor 228, a gate connected to the output of variable gain amplifier 222, and a source connected to ground.

Output stage 234 includes amplifier 236 and variable capacitor 238. Amplifier 236 includes a high-voltage N-channel MOS transistor 330, an N-channel MOS transistor 340, a high-voltage N-channel MOS transistor 350, and an N-channel MOS transistor 360. Transistor 330 is a thick gate oxide, high-voltage transistor having a drain connected to the first terminal of variable capacitor 238 and to the first terminal of the secondary side of balun 240, a gate for receiving a signal labeled "$V_{BIAS}$", and a source. Transistor 340 has a drain connected to the source of transistor 330, a gate for receiving an input signal labeled "IN⁺", and a source connected to ground. Transistor 350 is a thick gate oxide, high-voltage transistor having a drain connected to the second terminal of variable capacitor 238 and to the second terminal of the secondary side of balun 240, a gate for receiving signal $V_{BIAS}$, and a source. Transistor 360 has a drain connected to the source of transistor 340, a gate for receiving an input signal labeled "IN⁻", and a source connected to ground. IN⁺ and IN⁻ represent the true and complement components of the differential signal at the output of pre-amplification circuit 232.

As described above, multiple power transmitter 200 has a low output power path and a high output power path. In one embodiment, the low power output path is formed using low-voltage CMOS transistors and a low power supply voltage. The use of low voltage devices reduces device parasitic loss and improves power efficiency. Moreover $V_{DDL}$ does not need to be the same value as $V_{DD}$, and can be chosen independently of $V_{DD}$ to improve efficiency.

In order to provide an output power of 20 dBm, amplifier 236 provides a large signal swing and thus uses a power supply voltage of 3-4 volts applied to the center tap of balun 240. However transistors 330 and 350 are high voltage transistors and amplifier 236 uses them as cascode devices to absorb the large voltage swing and allow amplifier 236 to be switched by transistors 340 and 360 that are low voltage transistors.

In the illustrated embodiment, the low voltage path provided an output power of 0 dBm, i.e. 1 mW. In other embodiments, low-power amplification circuit 220 can provide another relatively low power, such as 3 dBm or 6 dBm.

In some embodiments, low-power amplification circuit 220 can be associated with one frequency of operation and high-power amplification circuit 230 can be associated with another frequency of operation. For example, low-power amplification circuit 220 can receive a 915 MHz carrier signal while low-power amplification circuit 230 can receive a 2.4 GHz carrier signal. Note that FIGS. 2 and 3 show exemplary circuit implementations for low-power amplification circuit 220 and high-power amplification circuit 230 that provide certain benefits and advantages described above, but other circuits could be used in other embodiments.

Figure 4:
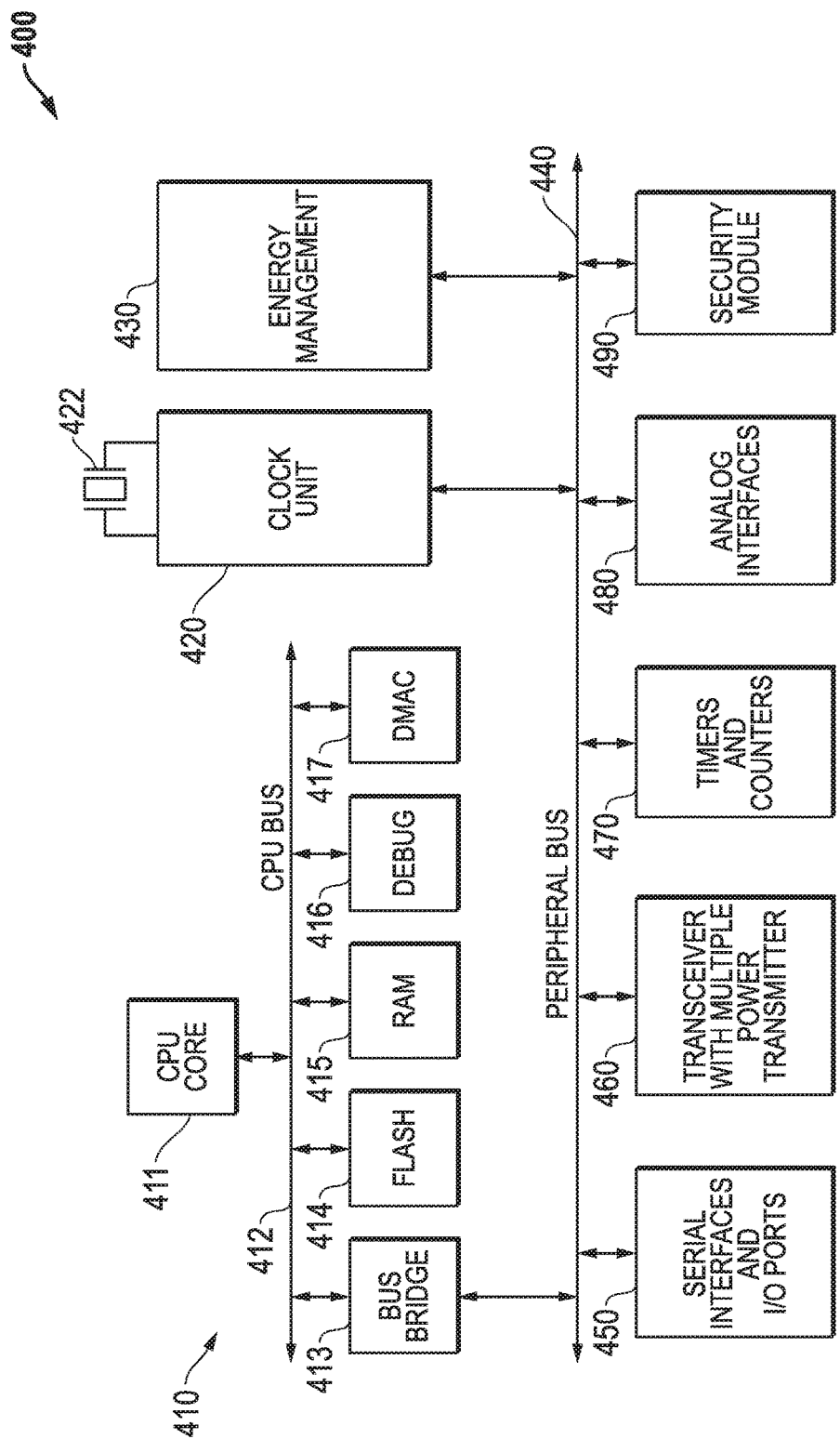
FIG. 4 illustrates in block diagram form a microcontroller unit (MCU) having a radio transmitter using the multiple-power transmitter of FIG. 2.

FIG. 4 illustrates in block diagram form a microcontroller unit (MCU) 400 having a radio transmitter using multiple-power transmitter 200 of FIG. 2. MCU 400 includes generally a central processing unit (CPU) system 410, clock unit 420, an energy management circuit 430, a peripheral bus 440, a set of serial interfaces and input/output (I/O) ports 450, a transceiver 460, a set of timers and counters 470, a set of analog interfaces 480, and a security module 490.

CPU system 410 includes a CPU bus 412 interconnecting a CPU core 411, a bus bridge 413, a FLASH memory 414, a random access memory (RAM) 415, a debug circuit 416, and a direct memory access (DMA) controller (DMAC) 417. CPU system 410 includes a CPU bus 412 separate from peripheral bus 440 to isolate transactions initiated by CPU core 411 to local devices and memory without affecting traffic on peripheral bus 440. Bus bridge 413 is a circuit that allows cross-bus transfers between CPU bus 412 and peripheral bus 440. CPU system 410 provides FLASH memory 414 for non-volatile storage of program code that can be bootstrap loaded from an external source, as well as parameters that need to be preserved when MCU 400 is powered down. RAM 415 provides a working memory for use by CPU core 411. Debug circuit 416 provides program trace capabilities with access to registers on CPU core 411 for software debug. DMAC 417 provides programmable DMA channels to offload CPU core 411 from routine data movement tasks between peripherals and memory.

MCU 400 includes a set of peripherals that make it suitable for a variety of general purpose embedded applications. Peripheral bus 440 interconnects bus bridge 413, clock unit 420, energy management circuit 430, serial interfaces and I/O ports 450, transceiver 460, timers and counters 470, analog interfaces 480, and security module 490. The serial interfaces in serial interfaces and I/O ports 450 operate according to a variety of synchronous and asynchronous character-oriented and serial protocols, and the I/O ports are a set of general-purpose input/output circuits and terminals that can be programmed for specific functions or remain available to software for general purpose operation. Transceiver 460 includes a multiple power transmitter such as multiple power transmitter 200 described above that includes a balun integrated on-chip. Timers and counters 470 provide various programmable timing and event counting functions useful for embedded control, and include a watchdog timer and a real time clock. Analog interfaces 480 include an analog comparator and analog-to-digital converter (ADC) for accurate analog input signal measurement. Security module 490 provides an encryption function that is useful for data communication and storage in secure environments.

Generally MCU 400 integrates CPU system 410 and several peripherals for a wide variety of application environments and is suitable for very low power operation. To facilitate low power operation, MCU 400 includes an energy management circuit 430 that provides several programmable functions to support extremely low power operation. For example energy management circuit 430 can include a voltage regulator to provide a precise internal power supply voltage that is sufficient for the internal operating speed but low enough in voltage to reduce power consumption. It can also include a brown-out detector designed to force MCU 400 into reset when power consumption is too high, as well as a low-power power on reset circuit.

In addition, MCU 400 includes a clock unit 420 with a variety of clocks and clock functions that MCU 400 uses to support its low power modes. For example, clock unit 420 can include high frequency oscillators based on crystal references, as well as lower precision fully integrated resistor-capacitor (RC) oscillators and very low speed RC oscillators that allow standby and keep-alive operations. Shown in FIG. 4 is a crystal resonator 422 that can be used with a crystal oscillator circuit in clock unit 420.

By integrating transceiver 460 with other common components on the same integrated circuit, MCU 400 provides a chip that can be used in a variety of RF transmission environments, while including many common peripherals. Also as noted above it can be fabricated using low-cost CMOS technology, including low-voltage CMOS transistors for the low-power transmission path along with high-voltage, thick oxide transistors that can withstand large voltage swings of, for example, 3-4 voltage without degrading the gate oxide.

The above-disclosed subject matter is to be considered illustrative, and not restrictive, and the appended claims are intended to cover all such modifications, enhancements, and other embodiments that fall within the scope of the claims. For example the above-disclosed embodiments combined a 915 MHz low-power transmitter connected to the primary side of an integrated balun along with a 2.4 GHz high-power transmitter connected to the secondary side of the integrated balun. In other embodiments, the supported frequencies and power levels will vary. The multiple power transmitter can be combined with various sets of components to form a flexible, general purpose MCU, and it should be understood that MCU 400 was just one such example. Moreover while specific low-power and high-power amplification circuits were shown, other implementations of the low-power and high-power amplification circuits can be used.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A radio frequency (RF) transmitter comprising:
   an RF signal source;
   a balun having a primary side adapted to be coupled to an antenna, and a secondary side;
   a first amplification circuit having an input coupled to said RF signal source, and an output coupled to said primary side of said balun; and
   a second amplification circuit having an input coupled to said RF signal source, and an output coupled to said secondary side of said balun, said second amplification circuit having a higher output power than said first amplification circuit.

2. The RF transmitter of claim 1, wherein said first amplification circuit comprises:
   a first amplifier having an input coupled to said RF signal source, and an output; and
   a second amplifier having an input coupled to said output of said first amplifier, and an output coupled to said output of said balun.

3. The RF transmitter of claim 2, wherein said second amplifier comprises:
   a first transistor having a first current electrode coupled to a first power supply voltage terminal, a control electrode coupled to said output of said first amplifier, and a second current electrode forming an output of said first amplification circuit; and
   a second transistor having a first current electrode coupled to said second current electrode of said first transistor, a control electrode coupled to said output of said first amplifier, and a second current electrode coupled to a second power supply voltage terminal.

4. The RF transmitter of claim 3, wherein said first transistor comprises a P-channel MOS transistor, and said second transistor comprises an N-channel MOS transistor.

5. The RF transmitter of claim 3, wherein said first transistor and said second transistor are low-voltage MOS transistors.

6. The RF transmitter of claim 1, wherein:
   said first amplification circuit provides a single ended signal to said output thereof; and
   said first amplification circuit further comprises a variable capacitor coupled between said output of said second amplifier and said primary side of said balun.

7. The RF transmitter of claim 1, wherein said second amplification circuit comprises:
   a pre-amplification circuit having an input coupled to said RF signal source, and an output; and
   a final amplification circuit having an input coupled to said output of said pre-amplification circuit, and an output coupled to said secondary of said balun.

8. The RF transmitter of claim 7, wherein said final amplification circuit comprises:
   a first transistor having a first current electrode coupled to said secondary side of said balun, a control electrode for receiving a bias signal, and a second current electrode;
   a second transistor having a first current electrode coupled to said second current electrode of said first transistor, a control electrode coupled to said output of said pre-amplification circuit, and a second current electrode coupled to a second power supply voltage terminal;
   a third transistor having a first current electrode coupled to said secondary side of said balun, a control electrode for receiving said bias signal, and a second current electrode; and
   a fourth transistor having a first current electrode coupled to said second current electrode of said third transistor, a control electrode coupled to said output of said pre-amplification circuit, and a second current electrode coupled to said second power supply voltage terminal.

9. The RF transmitter of claim 8, wherein said first transistor and said third transistor comprise high-voltage MOS transistors, and said second transistor and said fourth transistor comprise low-voltage MOS transistors.

10. The RF transmitter of claim 1, wherein:
said output of said second amplification circuit has first and second output terminals for providing a differential signal thereto; and
said second amplification circuit further comprises a variable capacitor coupled between said first and second output terminals of said second amplification circuit.

11. The RF transmitter of claim 1, wherein said RF signal source, said first amplification circuit, said second amplification circuit, and said balun are combined in a single integrated circuit.

12. An integrated circuit comprising:
a radio frequency transmitter comprising:
an RF signal source;
a balun having a primary side adapted to be coupled to an antenna, and a secondary side;
a first amplification circuit having an input for receiving a modulated signal, and an output coupled to primary side of said balun; and
a second amplification circuit having an input for receiving said modulated signal, and an output coupled to said secondary side of said balun, said second amplification circuit having a higher power than said first amplification circuit.

13. The integrated circuit of claim 12, wherein said first amplification circuit comprises:
a first amplifier having an input coupled to said RF signal source, and an output; and
a second amplifier having an input coupled to said output of said first amplifier, and an output coupled to said output of said balun.

14. The integrated circuit of claim 13, wherein said second amplifier comprises:
a first transistor having a first current electrode coupled to a first power supply voltage terminal, a control electrode coupled to said output of said first amplifier, and a second current electrode forming an output of said first amplification circuit; and
a second transistor having a first current electrode coupled to said second current electrode of said first transistor, a control electrode coupled to said output of said first amplifier, and a second current electrode coupled to a second power supply voltage terminal.

15. The integrated circuit of claim 14, wherein said first transistor comprises a P-channel MOS transistor, and said second transistor comprises an N-channel MOS transistor.

16. The integrated circuit of claim 14, wherein said first transistor and said second transistor are low-voltage MOS transistors.

17. The integrated circuit of claim 12, wherein:
said first amplification circuit provides a single ended signal to said output thereof; and
said first amplification circuit further comprises a variable capacitor coupled between said output of said second amplifier and said primary side of said balun.

18. The integrated circuit of claim 12, wherein said second amplification circuit comprises:
a pre-amplification circuit having an input coupled to said RF signal source, and an output; and
a final amplification circuit having an input coupled to said output of said pre-amplification circuit, and an output coupled to said secondary side of said balun.

19. The integrated circuit of claim 18, wherein said final amplification circuit comprises:
a first transistor having a first current electrode coupled to said secondary side of said balun, a control electrode for receiving a bias signal, and a second current electrode;
a second transistor having a first current electrode coupled to said second current electrode of said first transistor, a control electrode coupled to said output of said pre-amplification circuit, and a second current electrode coupled to a second power supply voltage terminal;
a third transistor having a first current electrode coupled to said secondary side of said balun, a control electrode for receiving said bias signal, and a second current electrode; and
a fourth transistor having a first current electrode coupled to said second current electrode of said third transistor, a control electrode coupled to said output of said pre-amplification circuit, and a second current electrode coupled to said second power supply voltage terminal.

20. The integrated circuit of claim 19, wherein said first transistor and said third transistor comprise high-voltage MOS transistors, and said second transistor and said fourth transistor comprise low-voltage MOS transistors.

21. The integrated circuit of claim 12, wherein:
said output of said second amplification circuit has first and second output terminals for providing a differential signal; and
said second amplification circuit further comprises a capacitor coupled between said first and second output terminals of said second amplification circuit.

22. The integrated circuit of claim 12 wherein:
said radio frequency transmitter is coupled to an internal bus; and
the integrated circuit is a microcontroller unit further comprising a central processing unit for processing instructions, wherein in response to a first predetermined instruction, said central processing unit places said transmitter into a low power mode and enables said first amplification circuit, and in response to a second predetermined instruction, said central processing unit places said transmitter into a high power mode and enables said second amplification circuit.

23. A method comprising:
receiving a modulated signal;
selectively amplifying said modulated signal according to a first output power level to form a first amplified signal;
selectively amplifying said modulated signal according to a second output power level higher than said first output power level to form a second amplified signal;
inputting said first amplified signal to a primary side of a balun;
inputting said second amplified signal to a secondary side of said balun; and
outputting a radio frequency output signal to a transmission medium in response to a signal at said primary side of said balun.

24. The method of claim 23, wherein outputting said radio frequency output signal to said transmission medium comprises:
filtering harmonics of said radio frequency output signal.

25. The method of claim 23, wherein outputting said radio frequency output signal to said transmission medium comprises:
  outputting said radio frequency output signal to an antenna.

26. The method of claim 23, wherein selectively amplifying said modulated signal according to said first output power level comprises:
  modulating conductivities of first and second transistors coupled in series between first and second power supply voltage terminals.

27. The method of claim 23, wherein selectively amplifying said modulated signal according to said second output power level comprises:
  differentially amplifying said modulated signal using first and second cascode transistors.

28. The method of claim 23, wherein outputting said radio frequency output signal comprises:
  outputting said radio frequency output signal to said transmission medium in response to a signal at said secondary side of an integrated circuit balun.

* * * * *